US012621277B2

(12) United States Patent
Chapman et al.

(10) Patent No.: US 12,621,277 B2
(45) Date of Patent: May 5, 2026

(54) VIRTUAL GATEWAY PROXY

(71) Applicant: Schlumberger Technology Corporation, Sugar Land, TX (US)

(72) Inventors: Clinton Chapman, Sugar Land, TX (US); Felipe Klein, Sugar Land, TX (US); Prince Mathew Samuel, Sugar Land, TX (US); Gang Qu, Sugar Land, TX (US); Akshay Hemant Dhavale, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 248 days.

(21) Appl. No.: 18/533,397

(22) Filed: Dec. 8, 2023

(65) Prior Publication Data

US 2025/0193162 A1      Jun. 12, 2025

(51) Int. Cl.
*H04L 9/40*                (2022.01)
(52) U.S. Cl.
CPC ........ *H04L 63/0435* (2013.01); *H04L 63/166* (2013.01); *H04L 63/20* (2013.01)
(58) Field of Classification Search
CPC .... H04L 63/0435; H04L 63/166; H04L 63/20
See application file for complete search history.

(56) References Cited

U.S. PATENT DOCUMENTS

| | | | | |
|---|---|---|---|---|
| 9,860,677 | B1 * | 1/2018 | Agerstam | ............... H04L 67/56 |
| 11,353,855 | B1 * | 6/2022 | Hahn | ............... G05B 19/41855 |
| 12,166,798 | B2 * | 12/2024 | Li | .......................... H04L 63/168 |
| 2015/0358312 | A1 * | 12/2015 | Kancharla | ............... H04L 63/04 |
| | | | | 713/171 |
| 2016/0321308 | A1 * | 11/2016 | Brinnand | .............. G06F 16/215 |
| 2023/0236828 | A1 * | 7/2023 | K | ............................... G06F 8/33 |
| | | | | 717/120 |
| 2023/0266969 | A1 * | 8/2023 | Mohan | .................... G06F 9/547 |
| | | | | 712/209 |
| 2023/0300075 | A1 * | 9/2023 | Peri | ........................ H04L 47/225 |
| | | | | 370/412 |

* cited by examiner

*Primary Examiner* — Michael R Vaughan

(74) *Attorney, Agent, or Firm* — Kyle R. Miiller

(57) ABSTRACT

The system and method in accordance with the present disclosure include an edge gateway to separate insecure protocols from the cloud and to securely transmit data to the cloud over a physical medium. Embodiments also include a virtual gateway that executes in a secure environment, and an adapter that enables a developer to have an endpoint to push data into an already segmented data area provided by the virtual gateway. The system and method allow a developer to publish data virtually to a data aggregator from a developer machine, or to publish data from a first gateway to a second virtual gateway to a data aggregator.

19 Claims, 10 Drawing Sheets

900

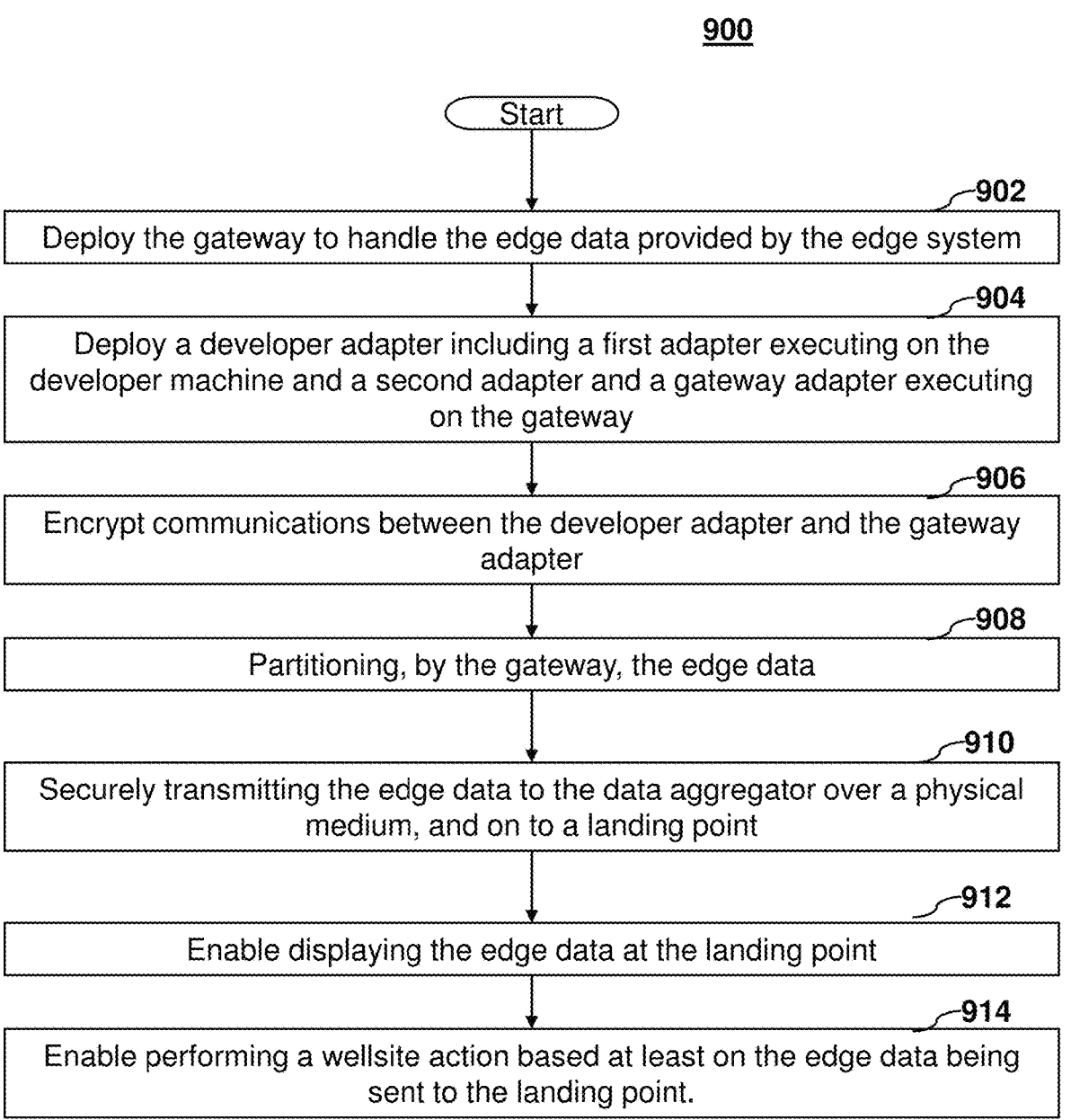

Start

902

Deploy the gateway to handle the edge data provided by the edge system

904

Deploy a developer adapter including a first adapter executing on the developer machine and a second adapter and a gateway adapter executing on the gateway

906

Encrypt communications between the developer adapter and the gateway adapter

908

Partitioning, by the gateway, the edge data

910

Securely transmitting the edge data to the data aggregator over a physical medium, and on to a landing point

912

Enable displaying the edge data at the landing point

914

Enable performing a wellsite action based at least on the edge data being sent to the landing point.

FIG. 9

VIRTUAL GATEWAY PROXY

BACKGROUND

An edge artificial intelligence (AI) platform that is designed for the oil, gas, and the broader energy industry includes openness, security, and ability to scale. Openness means, among other things, that the edge AI platform can work with equipment from a variety of manufacturers. Edge AI platforms and Internet of Things (IoT) solutions for the energy industry are designed to be secure from the field to the cloud. Edge AI platforms and IoT solutions are scalable. The edge AI platform can facilitate edge device management through remote tools and over-the-air updates.

Because many remote wellsites suffer from connectivity issues, edge computing enables some AI-based control and decision-making functions to be concentrated at the wellsite (or "at the edge"), rather than exclusively at remote data centers located elsewhere on the Internet (or "in the cloud"). The use of edge computing is making wellsite operations increasingly autonomous, with AI providing the "brains" to keep remote sites operating completely on their own, at peak efficiency, even during episodes of poor connectivity. When connectivity is available, the data collection and computing activities conducted at the wellsite can be reported back to users and services operating at data centers and other remote locations.

When developing solutions for an edge AI platform, a problem is that there is no easy way to generate data and see their effect in the cloud. Allowing a developer to publish data directly to the cloud from a development machine raises issues related to security and usability making it difficult for the targeted user, for example, but not limited to, a subject matter expert or a non-cloud developer, to deal with the problems of securing the edge. The step to move from development to using a hardware-based gateway is a difficult step. Relatedly, it is difficult to connect a customer's edge gateway to the cloud (or referred to herein as a data aggregator) without custom development on a gateway deployed in a customer's network. At the wellsite, a gateway device begins the process of connecting and interacting with edge devices. A Trusted Platform Module (TPM), a computer chip that can securely store artifacts used to authenticate a platform such as a personal computer (PC) or laptop, provides the gateway with an unforgeable identity and secure storage for cryptographic secrets. The gateway can enforce a secure measured boot by leveraging the TPM to provide protection against software tampering and malware infection. Another issue is to connect an application with a physical asset (for example, sensors/actuators/serial ports/ satellite/cellular/etc.) that is available in the gateway while testing. What is needed is to share, for example, serial and network ports on the gateway as though they were located on the developer's machine.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a non-transitory computer-readable medium storing instructions for publishing edge data to a data aggregator from an edge system deploying the gateway to handle the edge data provided by the edge system, where the gateway executes on a physical system, a virtual machine, the data aggregator, the developer machine, or a combination thereof. The gateway communicates with the developer machine using transmission control protocol (TCP)/user datagram protocol (UDP) ports, where the TCP/UDP ports include message queuing telemetry transport (MQTT)/advanced message queuing protocol (AMQP), hypertext transfer protocol secure (HTTPS), remote dictionary server (Redis), or other web services, and/or hardware ports, where the hardware ports include serial ports and/or universal serial bus (USB) ports and/or network ports. The gateway can be managed by device management software, where the management is local and/or remote. The gateway can include a routing message broker, and can include components that (a) provide the web services, (b) compute, transform, store, transmit, and receive the edge data, and (c) manage security, deployment, and monitoring services. The instructions also include deploying a developer adapter running on the developer machine and a gateway adapter running on the gateway, where the developer adapter resides in a segmented data area on the developer machine. The gateway adapter can reside in a segmented data area on the gateway. The developer adapter can provide a first programmatic interface that proxies calls to the gateway adapter for connections to the routing message broker. The developer adapter can also provide a second programmatic interface, where the second programmatic interface provides proxied services to the web services provided on the gateway. The gateway adapter can provide a third programmatic interface to receive requests from the web service, where the requests are proxied by the developer adapter. The developer adapter can provide synchronized file storage on an area of the developer machine to a storage area allocated to the gateway adapter on the gateway. The developer adapter initiates communication with the gateway adapter, and the gateway adapter provides a web service employing secure protocols for authentication and authorization. The instructions include encrypting communications between the developer adapter and the gateway adapter. The instructions also include partitioning, by the gateway, the edge data, where the edge data includes information acquired using protocols which are insecure, information transformed into a secure protocol for transmission to the data aggregator, and/or information contextualized based upon a configuration at the gateway. The instructions also include securely transmitting, by the gateway, the edge data to the data aggregator over a physical medium, and on to a landing point, where the transmission is enabled by cellular, satellite, Wifi, and/or Ethernet protocols. The gateway can communicate with another gateway. The instructions enable displaying the edge data at the landing point, and enable performing a wellsite action based at least on the edge data being sent to the landing point. Other embodiments of this aspect include corresponding computer systems, apparatus, and computer programs recorded on one or more computer storage devices, each configured to perform the actions of the instructions.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 9 is a flowchart illustrating a method in accordance with embodiments of the present disclosure for publishing edge data to a data aggregator from an edge system deploying the gateway to handle the edge data provided by the edge system, where the gateway executes on a physical system, a virtual machine, the data aggregator, the developer machine, or a combination thereof.

DETAILED DESCRIPTION

Reference will now be made in detail to embodiments, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
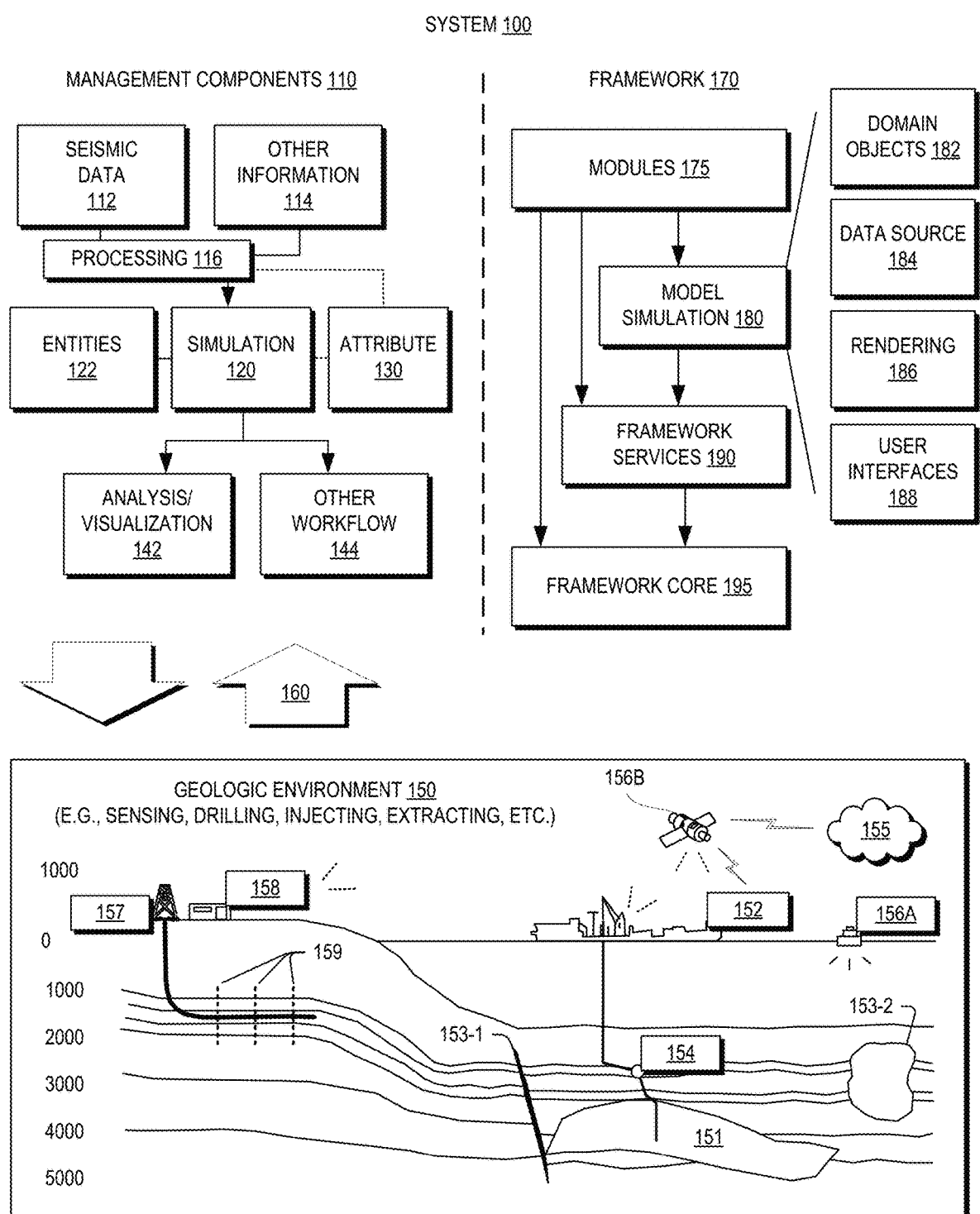
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156A and 156B may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Embodiments in accordance with the present disclosure include an edge gateway (also referred to herein as a virtual gateway) to separate insecure protocols from a data aggregator (also referred to herein as a cloud), and to securely transmit data to the data aggregator over a physical medium, enabled by cellular, satellite, WiFi and/or Ethernet. Embodiments also include a virtual gateway that executes in a secure environment, and a developer adapter, including adapters that execute on a developer machine and on the gateway, that enables a developer to have an endpoint to push data into an already segmented data area provided by the virtual gateway. The present disclosure allows a developer to publish data virtually from a developer machine. In another embodiment, data can be published from a first gateway to a second virtual gateway to a data aggregator.

Figure 2:
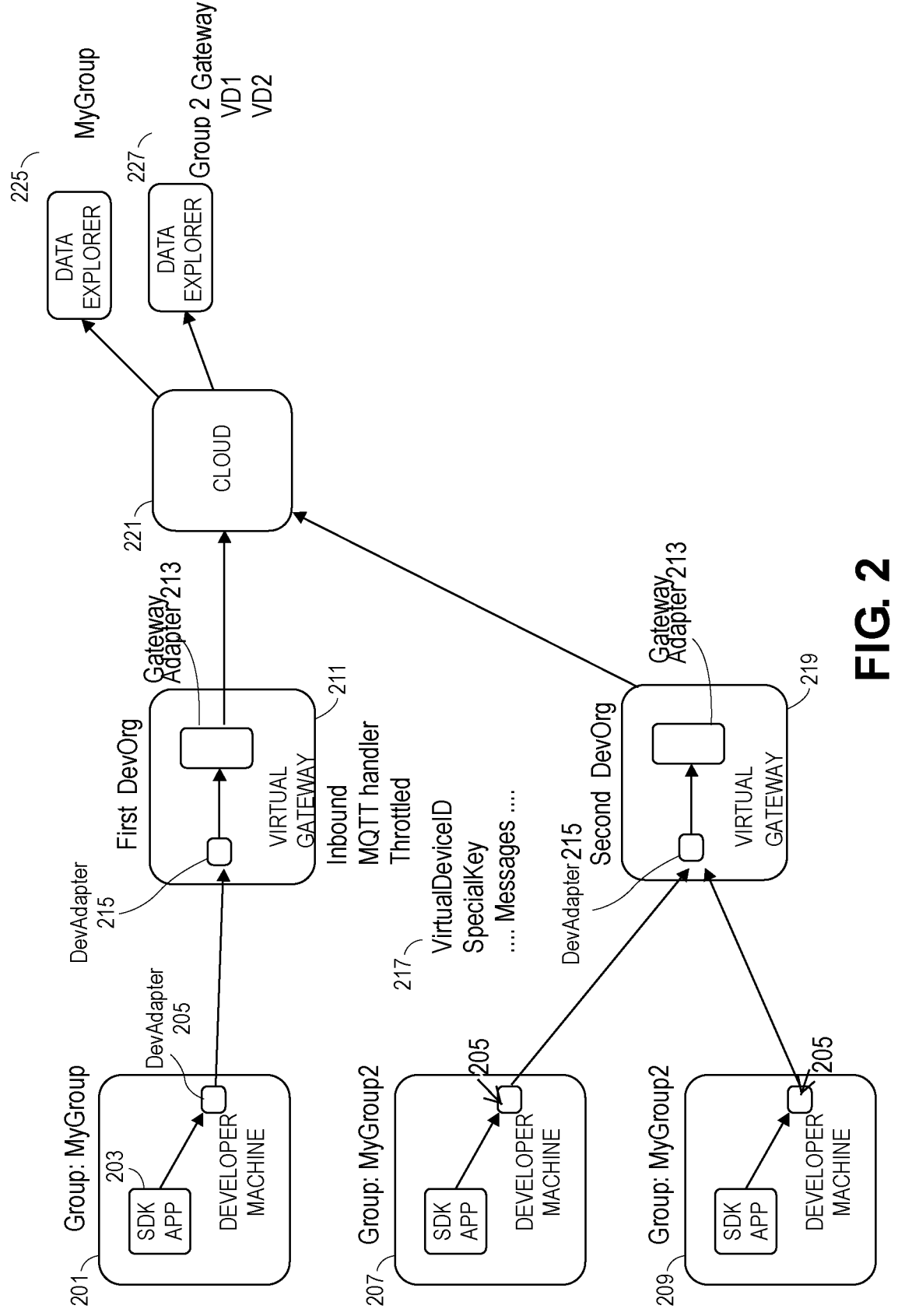
FIG. 2 is a data flow block diagram of an environment of an exemplary system in accordance with embodiments of the present disclosure.

Referring now to FIG. 2, an exemplary system in accordance with the present disclosure includes, on the left, two organizations, illustratively referred to in the diagram as mygroup 225 and mygroup2227. The first organization has a single machine 201 from which data are sent. The second organization has two machines 207 and 209. The first organization has created a virtual gateway 211 for a test device shown in the drawing as the developer machine 201 that executes a software development kit (SDK) enabled application 203. The second organization has created a virtual gateway 219 for test devices shown in the drawing as two developer machines 207 and 209 where two not necessarily related edge applications are executing. The first and second organizations have installed a developer adapter 205 on developer machines 201/207/209. The purpose of the developer adapter 205 is to communicate messages securely from the developer machines 201/207/209 to their assigned virtual gateways 211/219. During the provisioning/commissioning of the virtual gateways 211/219, the virtual gateway adapter 213 is configured with security measures 217 (public/private keys, secrets, etc.) that the developer adapter 205 is also configured with.

Continuing to refer to FIG. 2, users of the developer machines 201/207/209 can send messages using the SDK enabled applications 203 through a broker (not shown) to the first adapter 205, which communicates the messages to the paired second adapter 215 on the virtual gateway 211/219, then on to the gateway adapter 213. Throughout this description, the first adapter 205 and the second adapter 215 can be collectively referred to as the developer adapter. On the virtual gateways 211/219, any sort of mechanisms for throttling, security, computation, translation can be added prior to sending messages from the virtual gateways 211/219. The virtual gateways 211/219 act as managed proxies to the data aggregator 221. The virtual gateways 211/219 can be managed as physical gateways would be managed. The developer adapter 205/215 enables the virtual gateways 211/219 to act as proxies. The virtual gateways 211/219 could be virtual machines or other types of execution devices that contain the developer adapter 205/215, a routing broker (not shown), the gateway adapter 213, and any other services to meter connection, computation, and throttling as needed. The mechanism of communication between the developer adapter 205/215 and the gateway adapters 213 can include, for example, but not limited to, REST API calls (https), messaging (MQTT, AMQP, etc., for example, Mosquito deployed as a bridge), and/or a UDP/TCP Socket communication. The message payloads can be completely encrypted using security keys 217 held solely by the first and second organizations, for example. When the message arrives at the virtual gateways 211/219, the keys 217 could be used to decrypt the messages sent by the developer machines 201/207/209 before sending to the data aggregator 221.

Continuing to refer to FIG. 2, the benefits to providing a virtual gateway and developer adapters include, but are not limited to including, a developer can create test virtual devices and push data to cloud using the full services of the data aggregator without creating an edge device, enabling developers to move to the data aggregator quickly and see the results of their work; movement to a full gateway can be done if the virtual gateway becomes overloaded; scaling to include more virtual gateways can allow more edge application instances; throttling can be performed within the virtual gateway allowing a metered area that can protect the data aggregator endpoint from failures such as, for example, but not limited to, denial of service; segmentation of data is done at the virtual gateway, allowing an additional level of security to be integrated into the system, providing a controlled landing point per customer; and the data aggregator does not have to change.

In some configurations, a physical gateway that performs as if it were a virtual gateway can be used, allowing hardware connections and existing gateway applications to be used without having to commit a new edge application to a containerized image that would be deployed as a docker container. Refinement of models/computation/etc. can occur locally (e.g. on a developer machine) in a development environment while interacting with the physical hardware via the gateway's connectivity options as well as using gateway deployed applications. In other configurations, a physical gateway can be made extensible by using a virtual gateway. The virtual gateway can perform computational tasks as if they were being accomplished locally to the physical gateway. Thus, applications available in the data aggregator are performed as if they are being executed in the physical gateway, the virtual gateway, or the developer machine.

In some configurations, the virtual gateways can be tied together to expand their interconnectedness allowing selective management of portions of a virtual gateway, similar to configurations of extensible platforms. Some configurations can include multiple AI models running simultaneously in a virtual gateway or gateways that perform sets of collected services. In some configurations, a network of physical and virtual gateways enables application connectivity. Gateways functioning together in a narrow or broad set of physical or virtual gateways enables the movement of messages between applications. In some configurations, gateways can be managed remotely. In some configurations, a virtual gateway can execute on the edge device.

When deployed in customer system, the gateway enables the data aggregator to be accessible. The customer machine can run inside a test network, enabling a bridge between the customer and the data aggregator that is, for example, internal to a non-customer organization.

Figure 3:
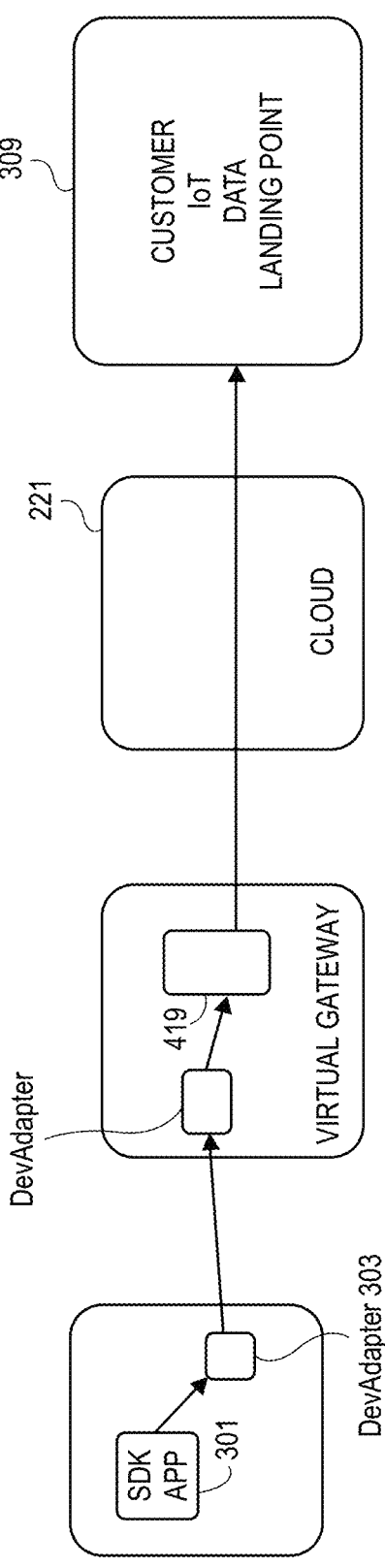
FIG. 3 is a data flow block diagram of an exemplary system in accordance with embodiments of the present disclosure including an internet of things (IoT) data landing point.

Referring now to FIG. 3, the SDK enabled application 301 generates an IoT message. When the message is communicated to the gateway adapter 419, through the developer adapter 303, the gateway adapter 419 converts the data to an encrypted pass-through message, which will pass through to the data aggregator 221, and into the customer IoT data landing point 309 where it is decrypted. If the message originating at the SDK enabled application 301 is a standard message type, the data will arrive in the customer IoT data landing point 309 without any adulteration from the gateway adapter 419 or the data aggregator 221. The customer IoT data landing point 309 can be a custom solution for a customer or can be a single tenant generic application (perhaps with customizability) that allows a customer to access data stored on the data aggregator 221, the data being generated by the SDK enabled application 301.

Figure 4:
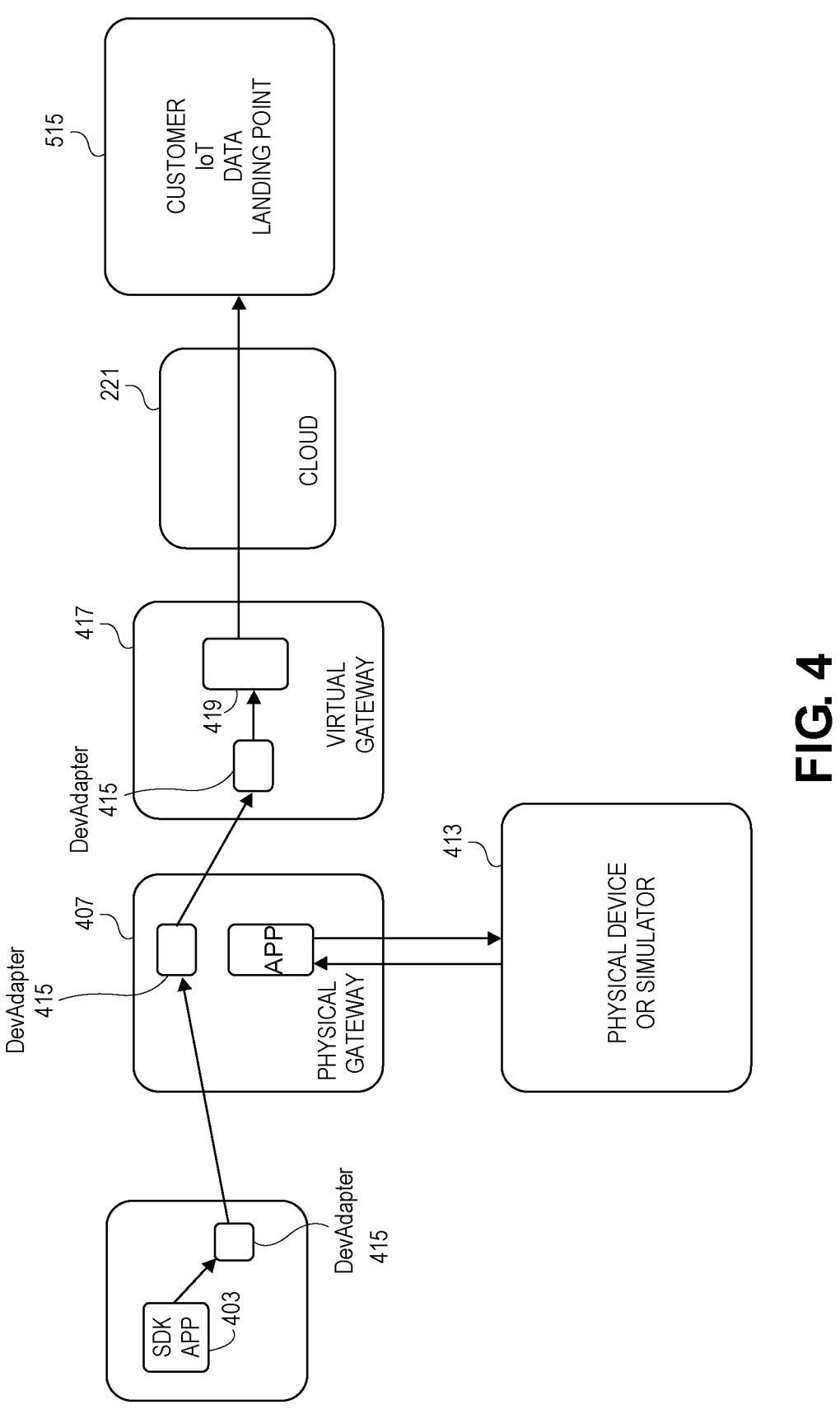
FIG. 4 is a data flow block diagram of an exemplary system in accordance with embodiments of the present disclosure including a physical gateway and physical device or simulator.

Referring now to FIG. 4, other embodiments can include, for example, but are not limited to including, an added physical gateway 413, or a physical gateway 407 with edge gateway 417 connectivity, or a physical gateway executing an SDK enabled application 403 with connectivity to a developer adapter 415. There can be multiple physical gateways/physical devices/simulator(s) in a user's environment that can move data through the system without disturbing the path of data through the data aggregator 221.

Figure 5:
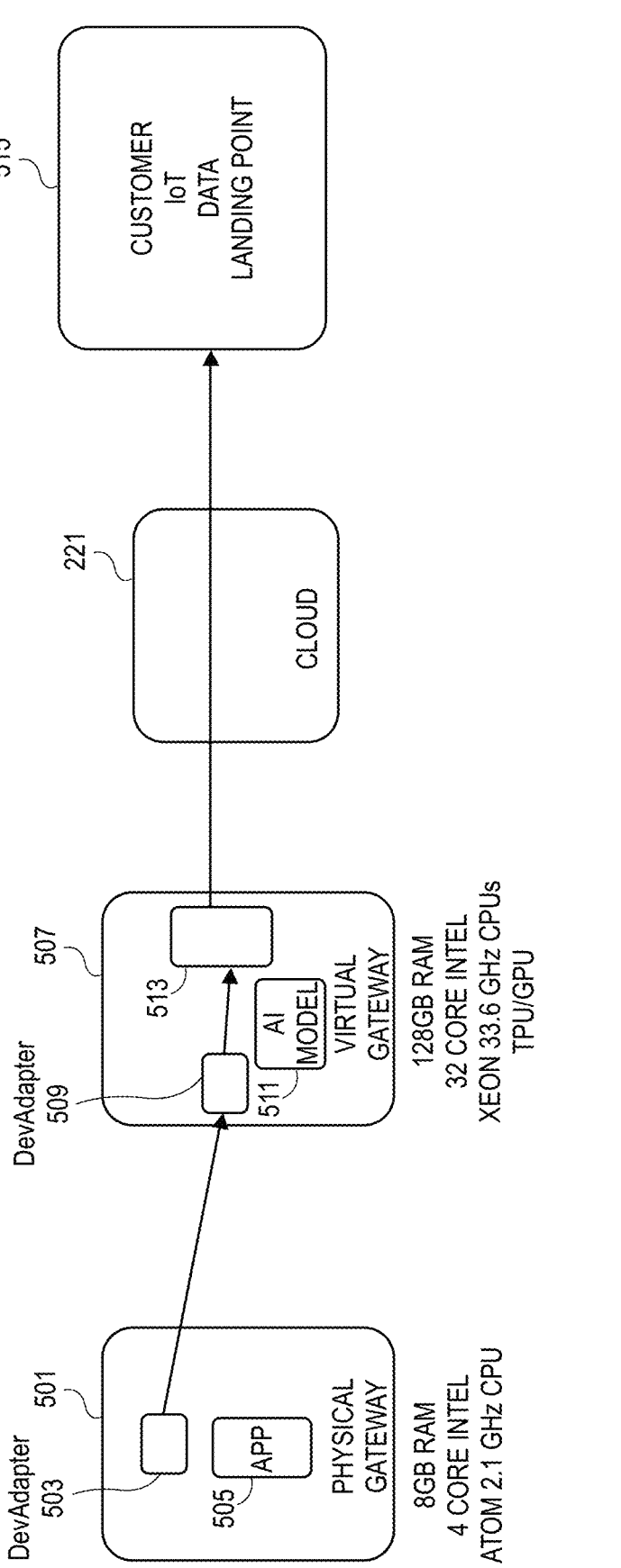
FIG. 5 is a data flow block diagram of an exemplary system in accordance with embodiments of the present disclosure including a physical gateway and an artificial intelligence (AI) model in a virtual gateway.

Referring now to FIG. 5, expanding the virtual gateway application can be done to provide broader computation capabilities. For example, a physical gateway 501 can execute a developer application 505 which the first adapter 503 pipes to a second adapter 509 on a virtual gateway 507. While the AI model 511 is performing various services, the gateway adapter 513 moves the data to the data aggregator 221 which routes the data on to the customer IoT data landing point 515. Exemplary hardware that can act as a physical gateway can include, but is not limited to including, 8 GB RAM and a 4 core Intel Atom 2.1 GHz CPU. Exemplary hardware that can act as a virtual gateway can include, but is not limited to including, 128 GB RAM and a 32 core Intel Xeon 33.6 GHz CPUs TPU/GPU.

Figure 6:
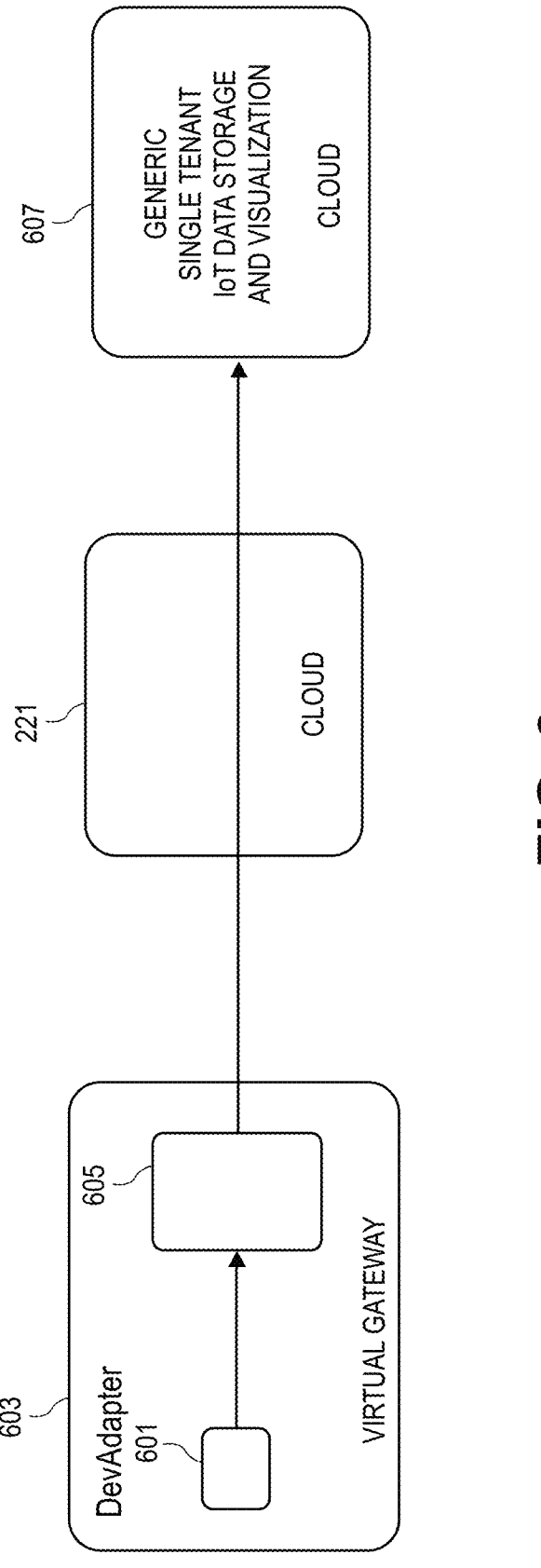
FIG. 6 is a data flow block diagram of an exemplary system in accordance with embodiments of the present disclosure including data flowing directly from a virtual gateway through a data aggregator to a generic single tenant IoT data storage and visualization data aggregator.

Referring now to FIG. 6, shown is a virtual gateway 603, a data aggregator 221, and a generic single tenant IoT data storage and visualization system 607. The virtual gateway 603 allows for data to flow into it through the developer adapter 601 to the gateway adapter 605, pass through the data aggregator 221, and pass to the generic single tenant solution 607 to allow isolation of the two systems, while maintaining the security provided by data aggregator endpoints, as well as management and expansion of capabilities in the virtual gateway 603, including its ability to expand the gateway's capabilities in terms of data throughput and computation. The generic single-tenant system (GST) 607 is a system that is deployed on a data aggregator, and that allows a user to develop a solution in a development environment or to use physical gateways connected through the virtual gateway 603. Applications on the GST 607 include charting tools, alarms, notifications, widget dashboard, and/or business intelligence type capabilities. The full system edge gateway 603, data aggregator 221, and GST 607 represent a single tenant isolated system that is managed by data aggregator 221. Even though data are flowing through the data aggregator 221, which is multi-tenant, the data can be encrypted by the edge gateway 603 to assure that end-to-end transmission of data cannot be sniffed.

Figure 7:
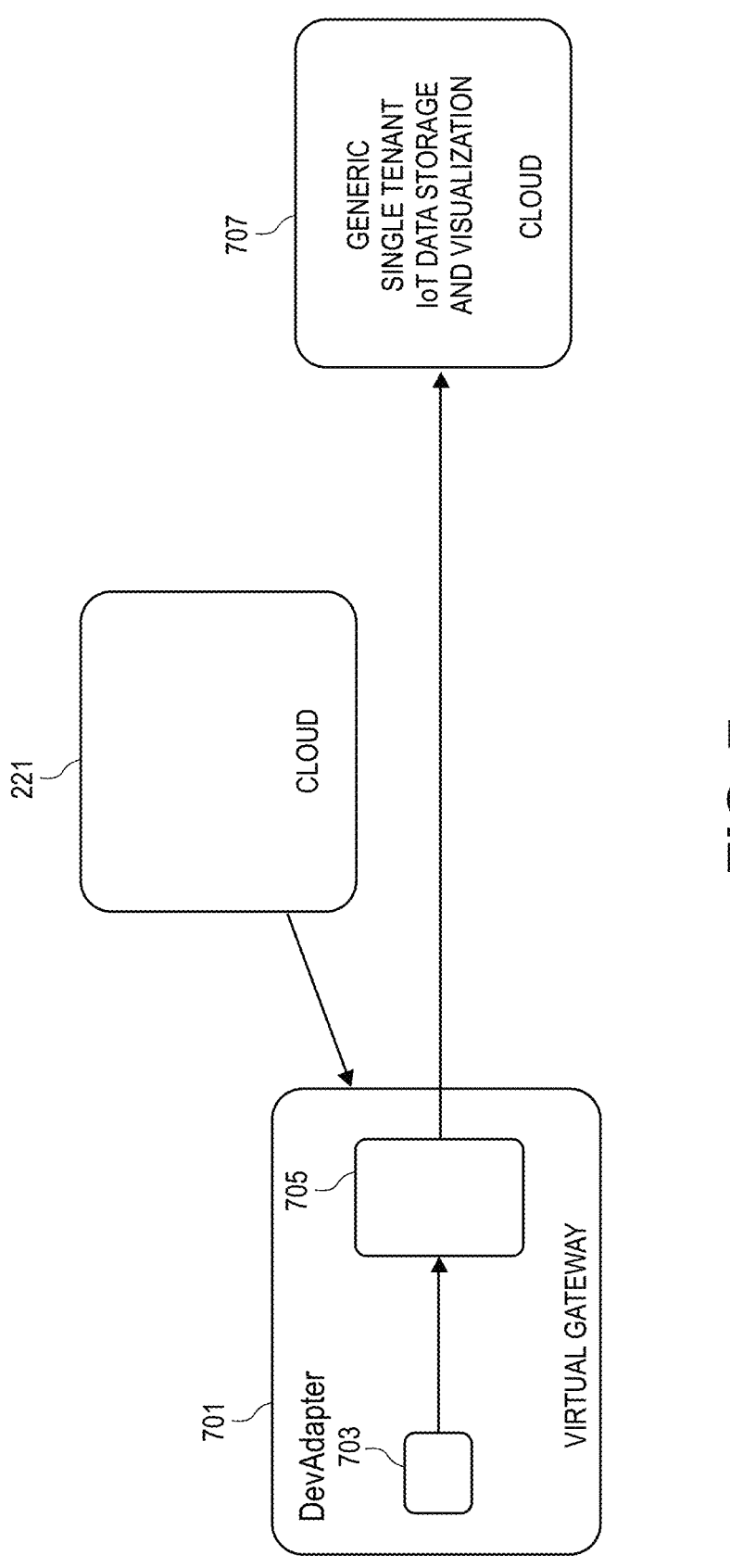
FIG. 7 is a data flow block diagram of an exemplary system in accordance with embodiments of the present disclosure including data flowing from a data aggregator to a virtual gateway to a generic single tenant IoT data storage and visualization data aggregator.

Referring now to FIG. 7, shown is another embodiment of the system of the present disclosure in which the edge gateway 701 is transmitting data directly to the GST 707. To further isolate data transmission from a user's edge device, the message is encrypted before it is sent to the edge gateway 701 (through the developer adapter 703 and the gateway adapter 705) and not decrypted until it arrives in the GST 707. This configuration provides end-to-end data encryption that does not rely on the data aggregator 221, even if the applications are maliciously altered on the edge gateway 701. Since the edge gateway 701 and the GST 707 can be separate, combining them more closely into a single product is possible as well.

Figure 8:
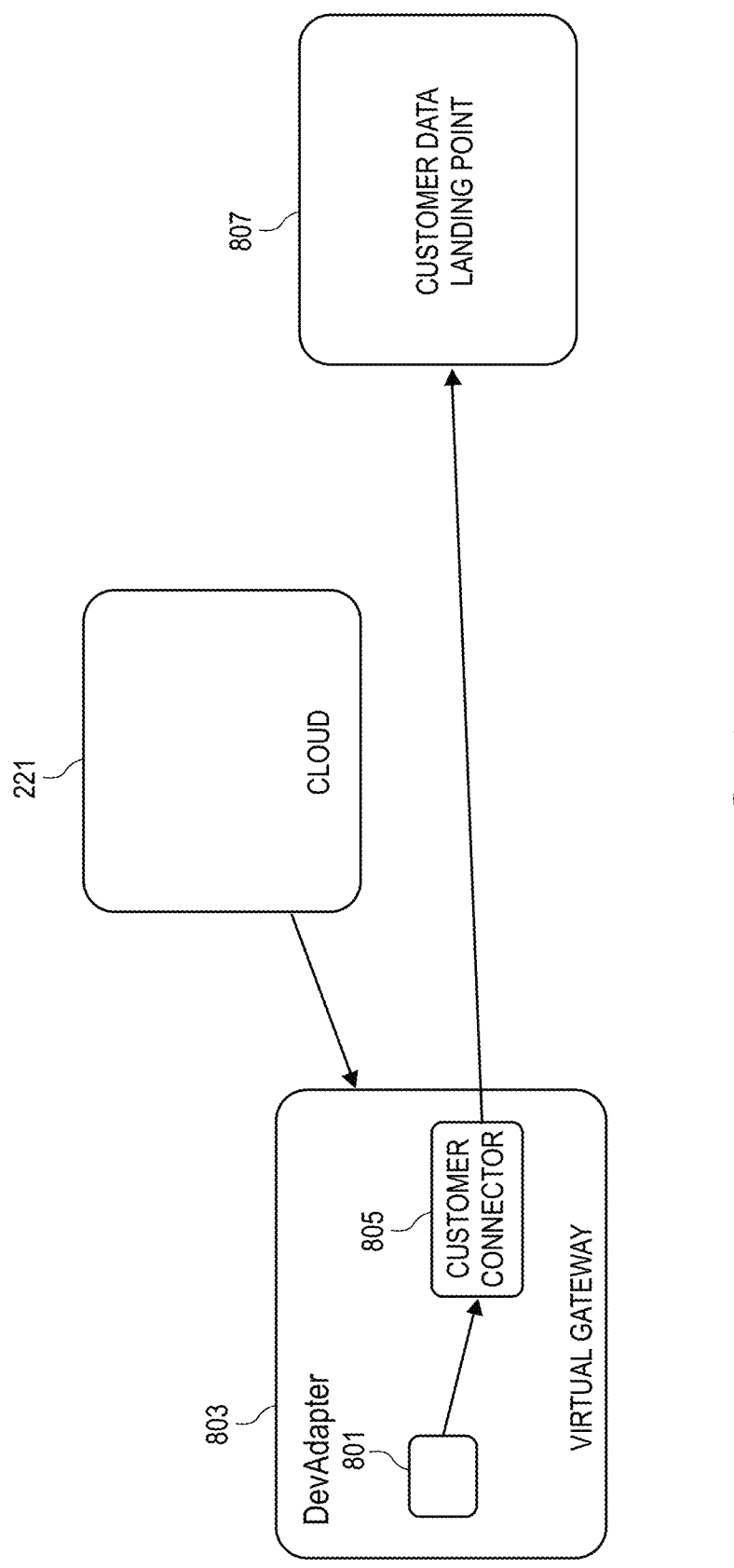
FIG. 8 is a data flow block diagram of an exemplary system in accordance with embodiments of the present disclosure including data flowing from a data aggregator to a virtual gateway through a customer connector to a customer data landing point.

Referring now to FIG. 8, the edge gateway 803 can push data directly to a customer's application since it is basically configured to be a "managed" message broker, where the GST adapter is replaced with a customer-specific connector 805, executing on the edge gateway 803 and receiving data from the developer adapter 801, that passes data to the customer-specific solution 807.

Referring now to FIG. 9, the method 900 for publishing edge data to a data aggregator from an edge system, the edge system including a gateway and a developer machine, the method 900 can include, but is not limited to including, deploying 902 the gateway to handle the edge data provided by the edge system, deploying 904 a developer adapter including a first adapter executing on the developer machine and a second adapter and a gateway adapter executing on the gateway, and encrypting 906 communications between the developer adapter and the gateway adapter. The method 900 includes partitioning 908, by the gateway, the edge data, and securely transmitting 910 the edge data to the data aggregator over a physical medium, and on to a landing point. The method 900 includes enabling displaying 912 the edge data at the landing point, and enabling performing 914 a wellsite action based at least on the edge data being sent to the landing point. The wellsite action may be based upon the partitioned edge data. The wellsite action may be or include generating and/or transmitting a signal (e.g., using a computing system) that causes a physical action to occur at a wellsite. The wellsite action may also or instead include performing the physical action at the wellsite. The physical action may include selecting where to drill a wellbore, drilling the wellbore, varying a weight and/or torque on a drill bit that is drilling the wellbore, varying a drilling trajectory of the wellbore, varying a concentration and/or flow rate of a fluid pumped into the wellbore, or the like.

Figure 10:
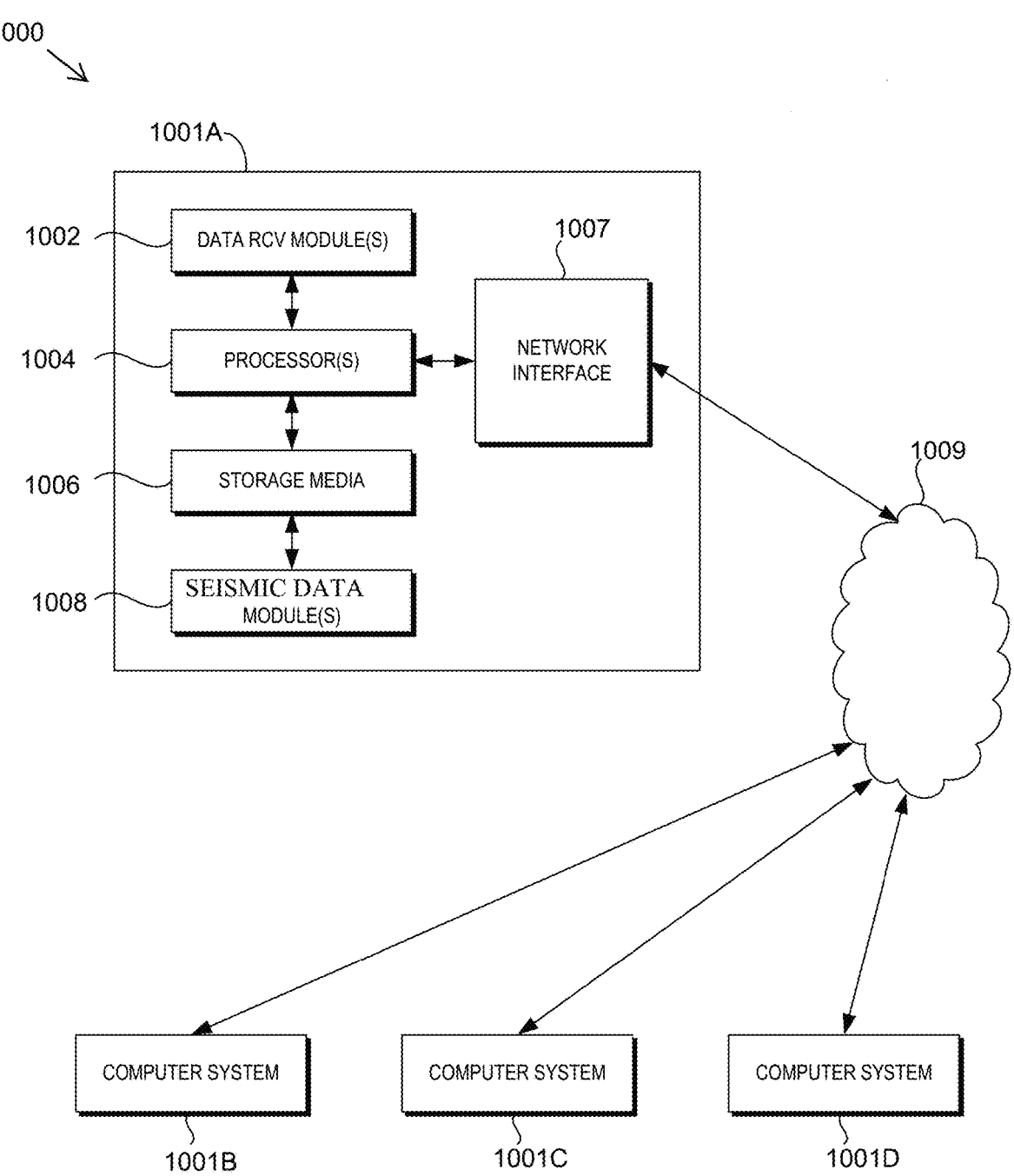
FIG. 10 illustrates a schematic view of a computing system, according to an embodiment.

In some embodiments, the methods of the present disclosure may be executed by a computing system. FIG. 10 illustrates an example of such a computing system 1000, in accordance with some embodiments. The computing system 1000 may include a computer or computer system 1001A, which may be an individual computer system 1001A or an arrangement of distributed computer systems. The computer system 1001A includes one or more data reception and processing modules 1002 that are configured to perform various tasks according to some embodiments, such as one or more methods disclosed herein. To perform these various tasks, the data reception and processing module 1002 executes independently, or in coordination with, one or more processors 1004, which is (or are) connected to one or more storage media 1006. The processor(s) 1004 is (or are) also connected to a network interface 1007 to allow the computer system 1001A to communicate over a data network 1009 with one or more additional computer systems and/or computing systems, such as 1001B, 1001C, and/or 1001D (note that computer systems 1001B, 1001C and/or 1001D may or may not share the same architecture as computer system 1001A, and may be located in different physical locations, e.g., computer systems 1001A and 1001B may be located in a processing facility, while in communication with one or more computer systems such as 1001C and/or 1001D that are located in one or more data centers, and/or located in varying countries on different continents).

A processor may include a microprocessor, microcontroller, processor module or subsystem, programmable integrated circuit, programmable gate array, or another control or computing device.

The storage media 1006 may be implemented as one or more computer-readable or machine-readable storage media. Note that while in the example embodiment of FIG. 10 storage media 1006 is depicted as within computer system 1001A, in some embodiments, storage media 1006 may be distributed within and/or across multiple internal and/or external enclosures of computing system 1001A and/or additional computing systems. Storage media 1006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 1000 contains one or more seismic data module(s) 1008. In the example of computing system 1000, computer system 1001A includes the seismic data module 1008. In some embodiments, a single subsurface operations module may be used to perform some aspects of one or more embodiments of the methods disclosed herein. In other embodiments, a plurality of subsurface operations modules may be used to perform some aspects of methods herein.

It should be appreciated that computing system 1000 is merely one example of a computing system, and that computing system 1000 may have more or fewer components than shown, may combine additional components not depicted in the example embodiment of FIG. 10, and/or computing system 1000 may have a different configuration or arrangement of the components depicted in FIG. 10. The various components shown in FIG. 10 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 1000, FIG. 10), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

The invention claimed is:

1. A method for publishing edge data to a data aggregator from an edge system, the edge system including a gateway and a developer machine, the method comprising:

initiating, by a developer adapter, communication with a gateway adapter, wherein the developer adapter includes a first adapter that executes in the developer machine, and a second adapter and the gateway adapter that execute in the gateway, the first adapter and the second adapter enabling communication of the edge data between the developer machine and the gateway, the gateway adapter enabling communication of the edge data between the gateway and the data aggregator, wherein the gateway adapter performs connection management and data translation between the gateway and the data aggregator, wherein the gateway adapter resides in a segmented data area on the gateway, provides a programmatic interface to receive requests from a web service, wherein the requests are proxied by the developer adapter, and provides the web service employing secure protocols for authentication and authorization;

encrypting communications between the developer adapter and the gateway adapter;

communicating, by the gateway, with the developer machine and managing, by the gateway, the edge data provided by the developer machine;

partitioning, by the gateway, the edge data; and securely transmitting the partitioned edge data to the data aggregator and on to a landing point.

2. The method of claim 1, wherein the gateway executes on a physical system, a virtual machine, the data aggregator, the developer machine, or a combination thereof.

3. The method of claim 1, wherein the gateway communicates with the developer machine using transmission control protocol/user datagram protocol (TCP/UDP) ports and/or hardware ports, wherein the TCP/UDP ports include message queuing telemetry transport (MQTT)/advanced message queuing protocol (AMQP), hypertext transfer protocol secure (HTTPS), remote dictionary server (Redis), or other web services, and hardware ports, wherein the hardware ports include serial ports, universal serial bus (USB) ports, and network ports.

4. The method of claim 1, further comprising:

managing the gateway by device management software.

5. The method of claim 4, wherein the managing the gateway is local to the gateway.

6. The method of claim 4, wherein the managing the gateway is remote to the gateway.

7. The method of claim 1, wherein the gateway comprises:

a routing message broker.

8. The method of claim 7, wherein the first adapter resides in a segmented data area on the developer machine, wherein the developer adapter provides a programmatic interface that proxies calls to the gateway adapter for connections to the routing message broker, wherein the programmatic interface provides proxied services to web services provided on the gateway, and provides synchronized file storage on an area of the developer machine to a storage area allocated to the gateway adapter on the gateway.

9. The method of claim 1, wherein the gateway comprises:

components that (a) provide web services, (b) compute, transform, store, transmit, and receive the edge data, and (c) manage security, deployment, and monitoring services.

10. The method of claim 1, wherein the edge data comprises:

the edge data acquired using protocols which are insecure, the edge data transformed into a secure protocol for transmission to the data aggregator, or the edge data contextualized based upon a configuration at the gateway.

11. The method of claim 1, wherein securely transmitting comprises:

transmitting over a physical medium by cellular, satellite, WiFi, or Ethernet protocols.

12. The method of claim 1, wherein the gateway communicates with another gateway.

13. A computing system for publishing edge data to a data aggregator from an edge system, the edge system including a gateway and a developer machine, the computing system including one or more processors and operations that execute instructions comprising:

initiating, by a developer adapter, communication with a gateway adapter, the developer adapter including a first adapter and a second adapter, wherein the first adapter executes in the developer machine and the second adapter and the gateway adapter execute in the gateway, wherein the first adapter resides in a segmented data area on the developer machine, wherein the developer adapter provides a programmatic interface that proxies calls to the gateway adapter for connections to a routing message broker, and provides synchronized file storage on an area of the developer machine to a storage area allocated to the gateway adapter on the gateway, wherein the programmatic interface provides proxied services to web services provided on the gateway;

encrypting, by the gateway, communications between the developer adapter and the gateway adapter;

communicating, by the gateway, with the developer machine and managing, by the gateway, the edge data provided by the developer machine, wherein the gateway communicates with the developer machine using transmission control protocol/user datagram protocol (TCP/UDP) ports and/or hardware ports, wherein the TCP/UDP ports include message queuing telemetry transport (MQTT)/advanced message queuing protocol (AMQP), hypertext transfer protocol secure (HTTPS), remote dictionary server (Redis), or other web services, wherein the hardware ports include serial ports, universal serial bus (USB) ports, and network ports;

partitioning, by the gateway, the edge data, wherein the edge data includes information acquired using protocols which are insecure, information transformed into a secure protocol for transmission to the data aggregator, or information contextualized based upon a configuration at the gateway;

securely transmitting, by the gateway, the partitioned edge data to the data aggregator and on to a landing point, wherein securely transmitting includes transmitting over a physical medium by cellular, satellite, WiFi, or Ethernet protocols; and enabling displaying the edge data at the landing point.

14. The computing system of claim 13, wherein the gateway executes on a physical system, a virtual machine, the data aggregator, the developer machine, or a combination thereof.

15. The computing system of claim 13, wherein the instructions further comprise:

remotely managing the gateway by device management software.

16. The computing system of claim 13, wherein the gateway comprises:

the routing message broker.

17. The computing system of claim 13, wherein the gateway comprises:

components that (a) provide the web services, (b) compute, transform, store, transmit, and receive the edge data, and (c) manage security, deployment, and monitoring services.

18. The computing system of claim 13, wherein the gateway adapter resides in a segmented data area on the gateway, provides a programmatic interface to receive requests from a web service, wherein the requests are proxied by the developer adapter, and provides the web service employing secure protocols for authentication and authorization.

19. A non-transitory computer-readable medium storing instructions for publishing edge data to a data aggregator from an edge system, the edge system including a gateway and a developer machine, the instructions, when executed by one or more processors of a computing system, cause the computing system to perform operations, the operations comprising:

deploying the gateway to handle the edge data provided by the edge system, wherein the gateway:

executes on a physical system, a virtual machine, the data aggregator, and the developer machine, communicates with the developer machine using transmission control protocol/user datagram protocol (TCP/UDP) ports, wherein the TCP/UDP ports include message queuing telemetry transport (MQTT)/advanced message queuing protocol (AMQP), hypertext transfer protocol secure (HTTPS), remote dictionary server (Redis), or other web services, and/or hardware ports, wherein the hardware ports include serial ports and/or universal serial bus (USB) ports and/or network ports, is managed by device management software, wherein the management is local and/or remote, contains a routing message broker, and includes components that (a) provide the web services, (b) compute, transform, store, transmit, and receive the edge data, and (c) manage security, deployment, and monitoring services;

deploying a developer adapter including a first adapter executing on the developer machine and a second adapter and a gateway adapter executing on the gateway, wherein:

the first adapter resides in a segmented data area on the developer machine, the second adapter and the gateway adapter reside in a segmented data area on the gateway, the developer adapter provides a first programmatic interface that proxies calls to the gateway adapter for connections to the routing message broker, the developer adapter provides a second programmatic interface, wherein the second programmatic interface provides proxied services to the web services provided on the gateway, the gateway adapter provides a third programmatic interface to receive requests from a web service, wherein the requests are proxied by the developer adapter, the developer adapter provides synchronized file storage on an area of the developer machine to a storage area allocated to the gateway adapter on the gateway, the developer adapter initiates communication with the gateway adapter, and the gateway adapter provides the web service employing secure protocols for authentication and authorization;

encrypting communications between the developer adapter and the gateway adapter;

partitioning, by the gateway, the edge data, wherein the edge data includes:

the edge data acquired using protocols which are insecure, the edge data transformed into a secure protocol for transmission to the data aggregator, and the edge data contextualized based upon a configuration at the gateway;

securely transmitting the edge data to the data aggregator over a physical medium, and on to a landing point, wherein the transmission is enabled by cellular, satellite, WiFi, or Ethernet protocols, wherein the gateway communicates with another gateway;

enabling displaying the edge data at the landing point; and enabling performing a wellsite action based at least on the edge data being sent to the landing point.

* * * * *